US011502822B2

(12) United States Patent
Iwama et al.

(10) Patent No.: US 11,502,822 B2
(45) Date of Patent: Nov. 15, 2022

(54) STATIC ANALYSIS OF SMART CONTRACT DETERMINISM

(71) Applicant: International Business Machines Corporation, Armonk, NY (US)

(72) Inventors: Futoshi Iwama, Tokyo (JP); Takaaki Tateishi, Yamato (JP); Shin Saito, Sagamihara (JP); Shunichi Amano, Katsushika (JP); Sachiko Yoshihama, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 16/808,322

(22) Filed: Mar. 3, 2020

(65) Prior Publication Data

US 2020/0287708 A1    Sep. 10, 2020

(30) Foreign Application Priority Data

Mar. 4, 2019  (JP) .............................. JP2019-038488

(51) Int. Cl.
*H04L 29/06*      (2006.01)
*H04L 9/06*       (2006.01)
*G06F 11/32*      (2006.01)
*H04L 9/00*       (2022.01)

(52) U.S. Cl.
CPC .......... *H04L 9/0637* (2013.01); *G06F 11/327* (2013.01); *H04L 9/50* (2022.05)

(58) Field of Classification Search
CPC ............... H04L 9/0637; H04L 2209/38; H04L 2209/26; H04L 9/3242; G06F 11/327; G06F 21/64; G06F 11/3688; G06F 11/3692

See application file for complete search history.

(56) References Cited

U.S. PATENT DOCUMENTS

| | | | |
|---|---|---|---|
| 9,069,893 B2 | 6/2015 | Vechev et al. | |
| 10,083,046 B2 | 9/2018 | Daudel et al. | |
| 10,764,752 B1* | 9/2020 | Avetisov | H04W 12/08 |
| 2018/0307859 A1* | 10/2018 | LaFever | H04L 63/20 |
| 2019/0066409 A1* | 2/2019 | Moreira da Mota | G07C 5/0808 |
| 2019/0081793 A1* | 3/2019 | Martino | G06Q 20/065 |
| 2019/0332807 A1* | 10/2019 | LaFever | G06F 21/6254 |
| 2020/0105096 A1* | 4/2020 | Ovalle | G07F 17/3225 |
| 2020/0287708 A1* | 9/2020 | Iwama | G06F 11/327 |
| 2020/0387440 A1* | 12/2020 | Shao | G06F 11/3608 |
| 2021/0044976 A1* | 2/2021 | Avetisov | H04W 12/069 |

FOREIGN PATENT DOCUMENTS

TW         201901546 A       1/2019

OTHER PUBLICATIONS

Nistor et al., "InstantCheck: Checking the Determinism of Parallel Programs Using On-the-fly Incremental Hashing", Proceedings of the 43rd Annual IEEE/ACM International Symposium on Microarchitecture, pp. 251-262, 2010.

* cited by examiner

*Primary Examiner* — Mahfuzur Rahman

(57) ABSTRACT

Smart contract code is verified by storing smart contract code, identifying a type system for verifying a determinism of the smart contract code based on a first set of security-level values and a second set of security level values, and verifying the determinism of the smart contract code by taking the first set of security-level values as deterministic values and the second set of security level values as non-deterministic values.

16 Claims, 10 Drawing Sheets

$$
\begin{array}{rrcl}
\text{(phrases)} & p & ::= & e \mid c \\
\text{(basic values)} & \nu & ::= & n \mid b \mid s \mid \cdots \\
\text{(values)} & v & ::= & \nu \mid \text{list}(v_1,..,v_n) \mid \text{map}(v_{11}:v_{12},..,v_{n1}:v_{n2}) \\
\text{(expressions)} & e & ::= & x \mid \nu \mid \varphi(e_1,..,e_n,\vec{e}_1^{\,j},..\vec{e}_m^{\,j}) \mid \alpha(e_1,..,e_n) \\
& & \mid & \text{list}(e_1,..,e_n) \mid \text{map}(e_{11}:e_{12},..,e_{n1}:e_{n2}) \\
& & \mid & e_1[e_2] \mid e.\text{length} \mid e.\text{keys} \mid \text{contains}(e_1,e_2) \mid \text{sort}(e) \\
& & \mid & \text{LD.get}(e) \mid \text{LD.contains}(e) \\
\text{(commands)} & c & ::= & x := e \mid x[e_1] := e_2 \mid x.\text{append}(e) \mid x.\text{delkey}(e) \\
& & \mid & \text{if } e \text{ then } c_1 \text{ else } c_2 \mid \text{for } x \text{ in } e \text{ do } c \mid \text{while } e \text{ do } c \\
& & \mid & c_1;c_2 \mid \text{skip} \mid \text{return } e \mid \text{LD.put}(e_1,e_2) \\
\text{(chaincode methods)} & md & ::= & name(x_1,..,x_n)\{c\}
\end{array}
$$

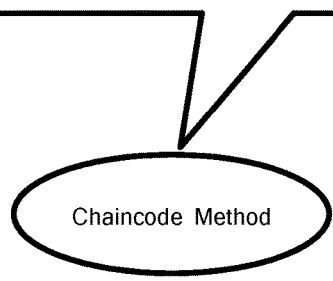

Chaincode Method

*FIG. 5*

We define
Chaincode method name $(x1,...,xn)\{c\}$
as "Deterministic" on the following condition for any $\mu_1, \mu_2$
$\mathbf{DL}_1 = \mathbf{DL}_2$ AND $v_{1i} = v_{2i}$ $(i = 1..n)$ AND
$\mathbf{DL}_1 \vdash (c, \mu_1[x_1 \mapsto v_{11}, \ldots, x_n \mapsto v_{1n}], \{\}) \longrightarrow^* (v_1?, \mu'_1, W_1)$
$\mathbf{DL}_2 \vdash (c, \mu_2[x_1 \mapsto v_{21}, \ldots, x_n \mapsto v_{2n}], \{\}) \longrightarrow^* (v_2?, \mu'_2, W_2)$
then
$W_1 = W_2$ AND $v_1? = v_2?$ Deterministic

*FIG. 6*

(determinacy degree) $\delta ::= D \mid N$
(data types) $\tau ::= \delta \mid \tau\text{list}\langle\delta_s,\delta_a\rangle \mid \tau\text{list}\langle\delta_s,\delta_a\rangle^{\text{set}} \mid [\tau_1,\tau_2]\text{map}\langle\delta_s\rangle$
(control data types) $\sigma ::= \tau\mathbf{1} \mid \tau\mathbf{1}[\overline{L}] \mid \tau\mathbf{1}[l] \mid \tau*[l] \mid \tau*$
(phrase types) $\rho ::= \tau\ \text{var}\ L \mid \sigma\ \text{ivar} \mid \tau\ \text{cmd}\ \langle\delta_s,\delta_a\rangle\ L$ $\tau^D ::= D \mid \tau^D\text{list}\langle D,D\rangle \mid \tau^D\text{list}\langle D,D\rangle^{\text{set}} \mid [\tau_1^D,\tau_2^D]\text{map}\langle D\rangle$
$\tau^N ::= N \mid \tau^N\text{list}\langle N,N\rangle \mid \tau^N\text{list}\langle N,N\rangle^{\text{set}} \mid [\tau_1^N,\tau_2^N]\text{map}\langle N\rangle$
$\tau^{N_E} ::= N \mid \tau^N\text{list}\langle\delta_s,\delta_a\rangle \mid \tau^N\text{list}\langle\delta_s,\delta_a\rangle^{\text{set}} \mid [\tau_1^N,\tau_2^N]\text{map}\langle\delta_s\rangle$ $\delta' \vee_E \delta = \delta' \vee \delta \qquad [\tau_1,\tau_2]\text{map}\langle\delta_s\rangle \vee_E \delta = [\tau_1 \vee_E \delta, \tau_2 \vee_E \delta]\text{map}\langle\delta_s\rangle$
$\tau\text{list}\langle\delta_s,\delta_a\rangle \vee_E \delta = \tau \vee_E \delta\text{list}\langle\delta_s,\delta_a\rangle \qquad \tau\text{list}\langle\delta_s,\delta_a\rangle \vee_E \delta = \tau \vee_E \delta\text{list}\langle\delta_s,\delta_a\rangle$ $[\tau\mathbf{1}]_1^* = \tau\mathbf{1} \quad [\tau\mathbf{1}[\overline{L}]]_1^* = \tau\mathbf{1}[\overline{L}] \quad [\tau\mathbf{1}[l]]_1^* = \tau*[l] \quad [\tau*[l]]_1^* = \tau*[l] \quad [\tau*]_1^* = \tau*$

STATIC ANALYSIS OF SMART CONTRACT DETERMINISM

TECHNICAL FIELD

The example embodiments relate to testing smart contract code of blockchain and more specifically to testing the determinism of the smart contract code.

BACKGROUND

In blockchain, smart-contract code needs to be deterministic. That is, the code needs to write deterministic data into ledger and also return a deterministic data to client. A lot of smart contracts are often described by general-purpose programming language (e.g., GO, Java, Javascript, etc.). A few languages for describing a smart contract (e.g., Solidity, etc.) restrict the expressive power so that a developer cannot describe some type of non-deterministic code. Yet, Solidity is not perfect, because it can contain code described by a general-purpose language (e.g. Javascript). So, the smart contract code is fully checked manually to ensure that it is deterministic.

SUMMARY

One example embodiment provides a computer-implemented method that may include one or more of storing smart contract code, identifying a type system for verifying a determinism of the smart contract code based on a first set of security-level values and a second set of security level values, and verifying the determinism of the smart contract code by taking the first set of security-level values as deterministic values and the second set of security level values as non-deterministic values.

Another example embodiment provides an apparatus that may include a processor and memory, wherein the processor and memory are communicably coupled to one another, and the processor may be configured to store smart contract code, verify a determinism of the smart contract code by applying a type system to the smart contract code based on a first set of security level values and a second set of security level values, and wherein the processor applies the first set of security level values as deterministic values to the smart contract code and applies the second set of security level values as non-deterministic values to the smart contract code.

Another example embodiment may include a non-transitory computer-readable medium comprising instructions that when read by a processor cause the processor to perform a method that includes one or more of storing smart contract code, verifying a determinism of the smart contract code by applying a type system to the smart contract code based on a first set of security level values and a second set of security level values, and wherein the verifying comprises applying the first set of security level values as deterministic values to the smart contract code and the second set of security level values as non-deterministic values to the smart contract code.

The summary clause does not necessarily describe all features of the embodiments. In addition, the example embodiments may also include sub-combinations of the features described above.

BRIEF DESCRIPTION OF THE DRAWINGS

The following description will provide details of the example embodiments with reference to the following figures wherein:

FIG. 5 is a diagram illustrating chaincode methods, according to an example embodiment;

FIG. 6 is a diagram illustrating a definition of determinism of a chaincode method, according to an example embodiment;

FIG. 7A is a diagram illustrating types and operators of an exemplary type system, according to an example embodiment;

FIG. 7D is a diagram illustrating typing rules on commands of an exemplary type system, according to an example embodiment;

DETAILED DESCRIPTION

Hereinafter, example embodiments will be described. The example embodiments shall not be limited according to the claims, and the combinations of the features described in the embodiments are not necessarily essential.

Figure 1:
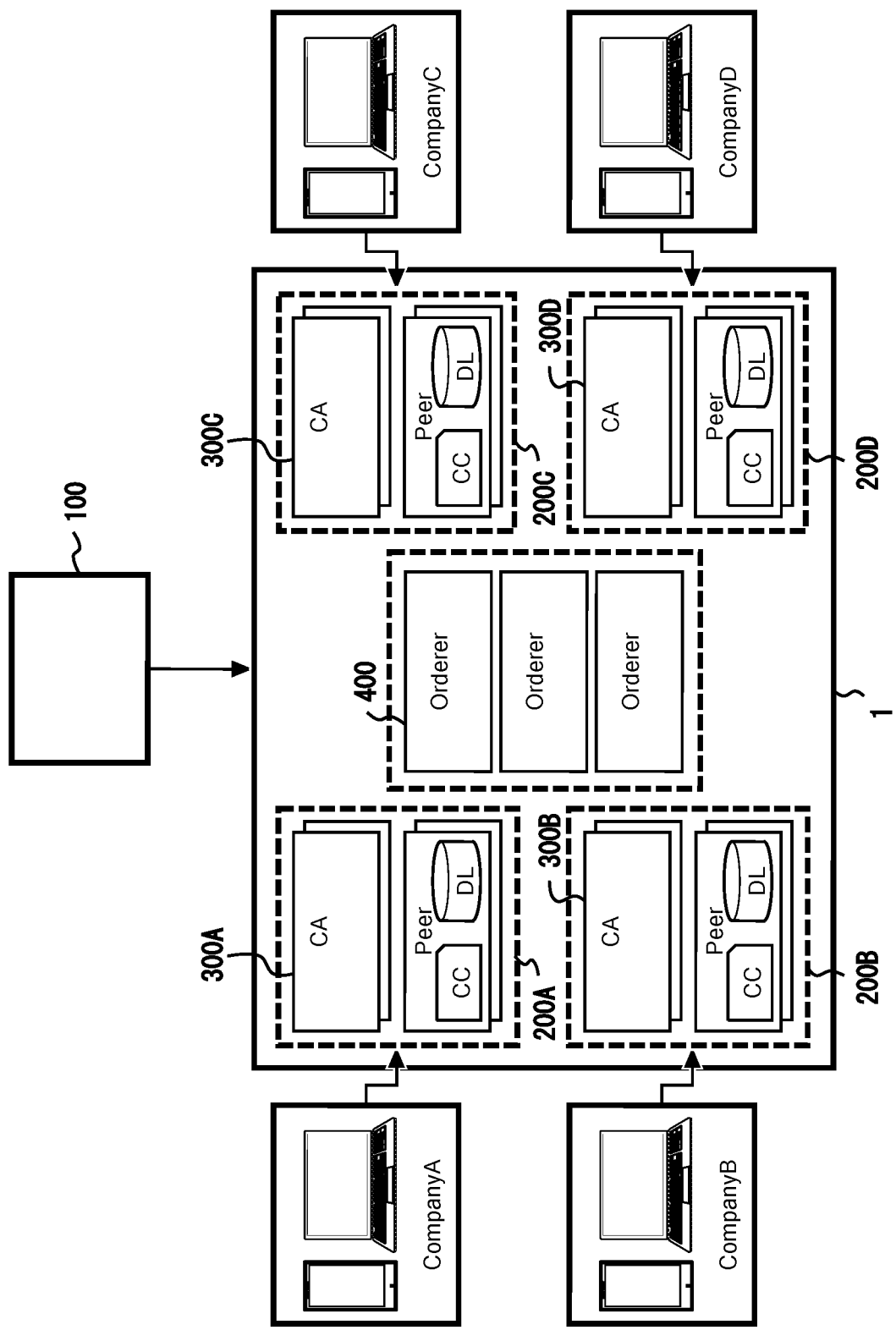
FIG. 1 is a diagram illustrating a configuration of a blockchain system, according to an example embodiment.

FIG. 1 illustrates a configuration of a blockchain system 1, according to an example embodiment. The system 1 as a whole may be a distributed database, where a plurality of nodes can maintain common data, process a transaction, and grow a blockchain.

The system 1 may implement a Hyperledger Fabric framework. In some embodiments, the system may be a permissioned type or consortium type platform in which a plural of business entities (Company A, B, C and D) are taking part. In addition, in some embodiments, the system 1 can also perform other blockchain technologies. A number of implementations adopted for Hyperledger Fabric and other blockchain technologies may be used for the embodiments explained below.

The system 1 includes a plurality of nodes connected by a secure network. The nodes comprises peer nodes 200, certificate authority (CA) nodes 300 and orderer nodes 400. In the following embodiments, each company manages a pair of peer nodes 200 and a pair of CA nodes 300. Companies share a plural of orderer nodes 400.

Peer nodes 200 are elements in the blockchain system. Each peer node 200 has the same distributed ledger (DL) and smart contract code, called chaincode (CC). CC is developed and deployed by a development system 100, which is to be explained more in detail later. There are two types of peer nodes 200. The one is endorsement peer to verify transactions and the other one is committing peer to write transactional history in a block of DL.

Figure 2:
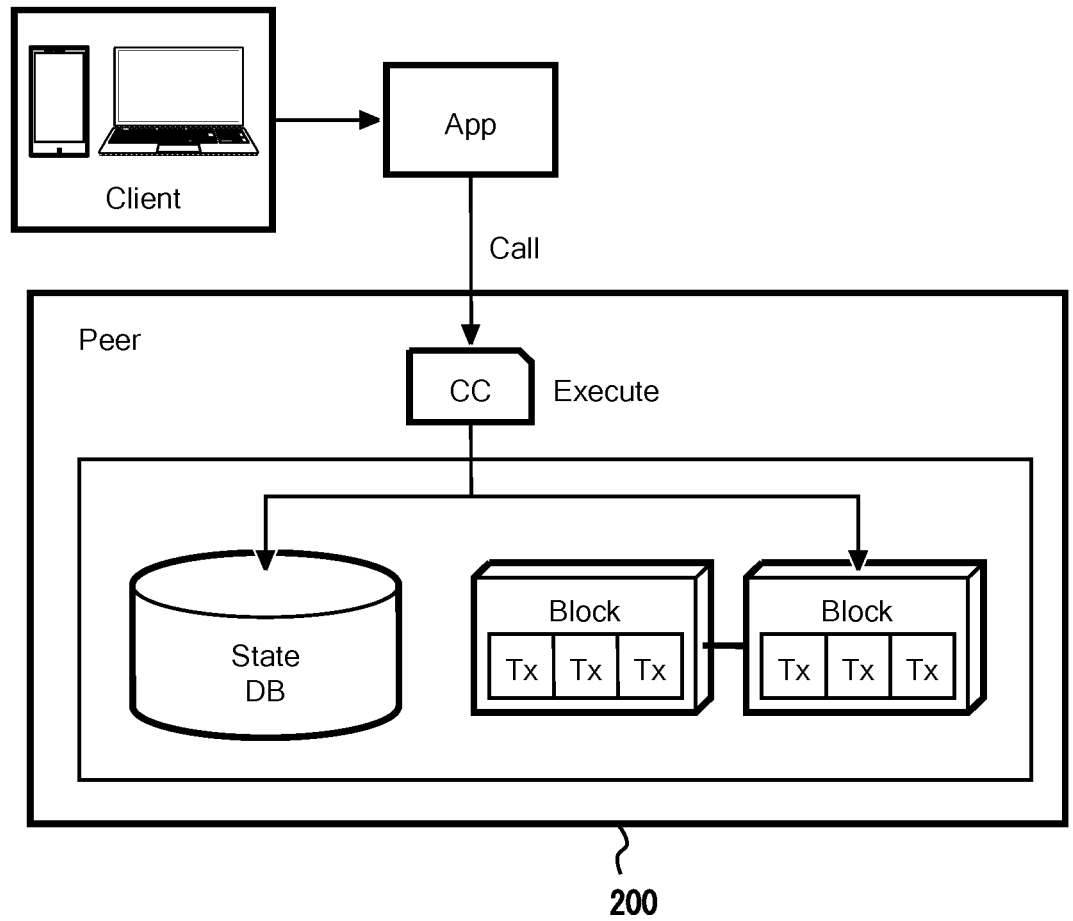
FIG. 2 is a diagram illustrating a peer node in a blockchain system, according to an example embodiment.

FIG. 2 illustrates functions of a peer node in a blockchain system, according to an example embodiment. The functions of the peer node 200 are (1) connecting with applications, (2) storing DL and (3) executing CC. As for (1) connecting with applications, peer node 200 verifies and executes transactions (Tx) from applications on blockchain (Hyperledger Fabric). Peer node 200 writes execution logs in a block of DL and execution results in state database (DB) of DL. As for (2) storing DL, the DL has a blockchain (a plural of connected blocks) and a state DB. Peer node 200 writes an execution history of a CC in the blockchain and writes the latest status resulting from executing Tx in the state DB. All status after executing a Tx is stored in state DB. A client is capable of referring and writing data in state DB, by calling a CC from application. Blockchain is connected with hash values so that it is secure from manipulations. The same DL is shared in peer nodes 200 of the blockchain system 1 to keep consistency among the peer nodes 200. As for (3) executing CC, peer node 200 may execute a CC, which is program code implementing business terms and conditions as business logic. For example, the CC can describe an asset transfer from company A to company B. Also, the same CC is shared in peer nodes 200 of the blockchain system 1 to keep consistency.

CA nodes 300 register information of user (ex. Company A) and issue a digital certificate called "ECerts", by using a mechanism of Membership Service Provider (MPS). The functions of CA include registrations of peer nodes and users, management of IDs, issuing and managing ECerts. Only Tx signed with ECerts is executable in the system 1.

Orderer nodes 400 construct blocks which may include a plurality of transactions, and broadcast the blocks in the system 1 by a channel. The channel is a virtual network on the system 1. The functions of orderer nodes include making procedure of Txs, packing the Txs in a block and sending the packaged block to peer nodes 200, based on channel.

Figure 3:
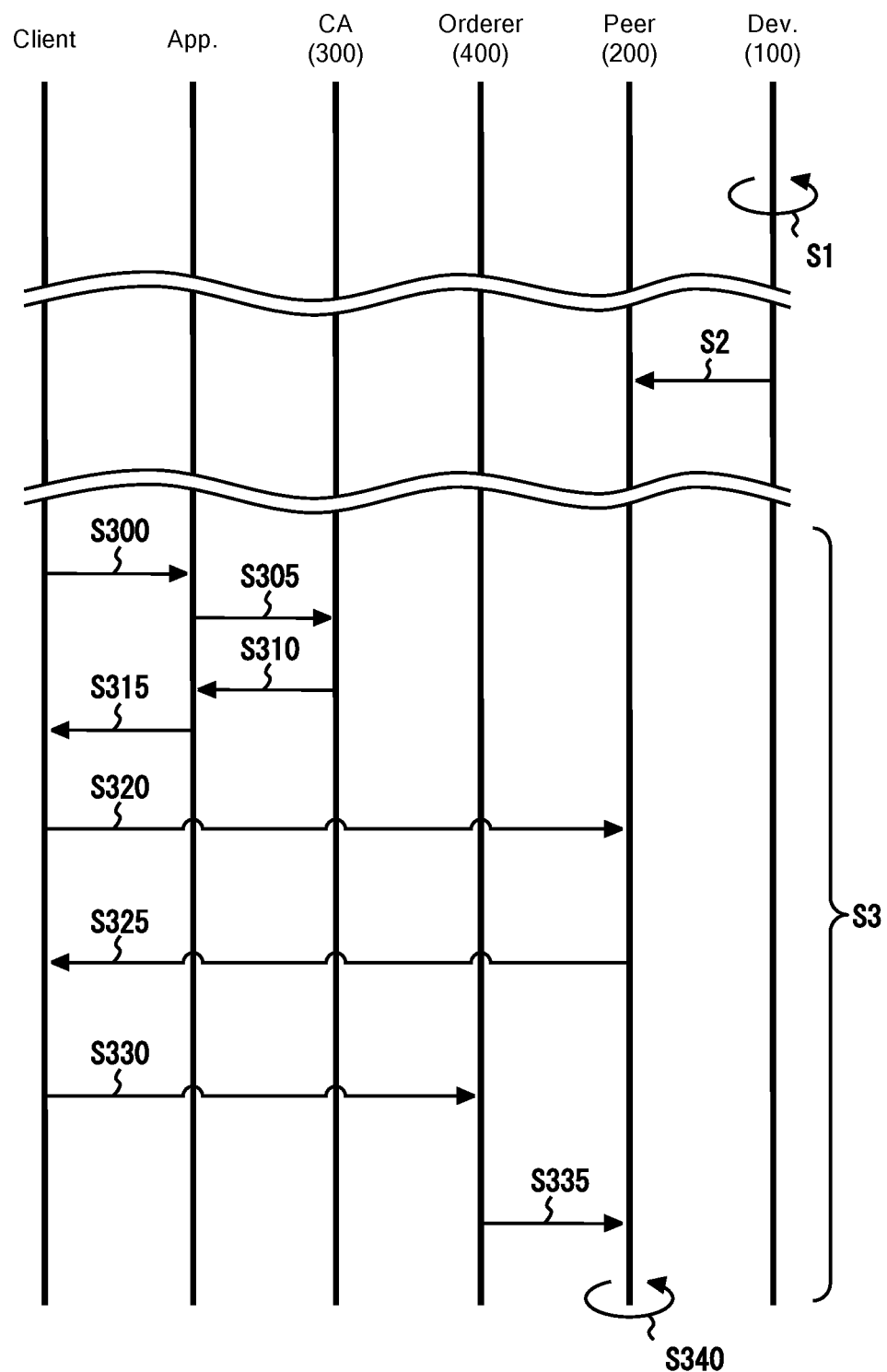
FIG. 3 is a diagram illustrating a system messaging diagram of the interactions in a blockchain system, according to an example embodiment.

FIG. 3 illustrates a system messaging diagram of the interactions in the system 1, according to an example embodiment. The lower part (Step S3) illustrates a basic transaction in the system 1. First, a client sends a request to an application (Step S300), the application sends the request to CA node 200 (Step S305). If the request satisfies pre-determined conditions, CA node 200 issues a digital certificate (Step S310) for the application. The application sends the certificate to the client (Step S315).

The client may send peer node 200 a Tx signed with the certificate (Step S320). In response to receiving the Tx, peer node 200 executes the CC in accordance with the Tx, verifies the executed result and sends back the result signed with its certificate (Step S325).

In response to receiving the verified result, the client sends the Tx to orderer node 400 (Step S330). Orderer node 400 determines the order of Txs in one block, which have been received in a pre-determined time window. Orderer node 400 broadcasts the block of Txs to peer nodes 200 (Step S335). In response to receiving the block, peer nodes 200 verify the block and write the block in its DL (Step S340).

As mentioned earlier, the CC is developed in developer system 100 (Step S1) and deployed in peer nodes 200 (Step S2). So, determinism of a method implemented by the CC may be verified to maintain consistency of DL in the system 1.

Figure 4:
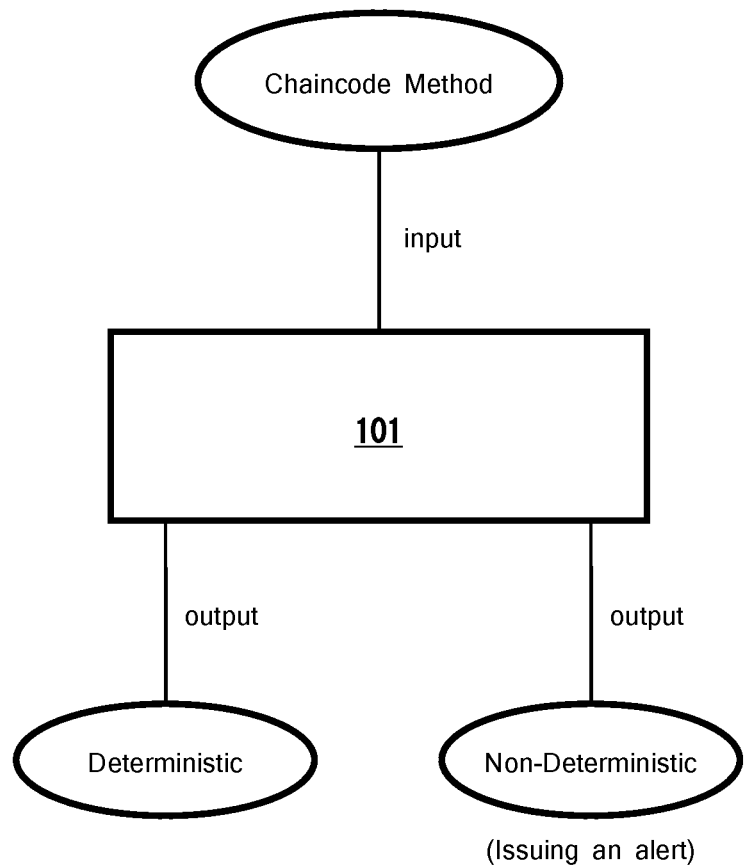
FIG. 4 is a diagram illustrating a configuration of a type system, according to an example embodiment.

FIG. 4 illustrates a configuration of a type system 101 implemented in the developer system 100, according to an example embodiment. The type system 101 checks if a CC is deterministically executed in the DL. The input of the system 101 is a chaincode method, and the output is the decision that it is deterministic or non-deterministic. Also, type system 101 may issue an alert if the decision is non-deterministic. With this type system 101, only deterministic chain code is deployed in peer nodes 200 (Step S2).

Figure 7B:
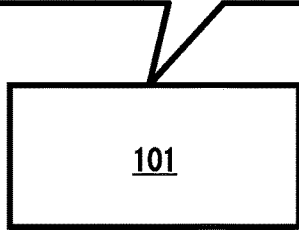
FIG. 7B is a diagram illustrating a part type relationships and part deterministic relations of an exemplary type system, according to an example embodiment.
Figure 7C:
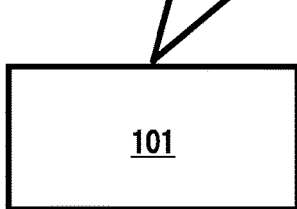
FIG. 7C is a diagram illustrating typing rules on formulas of an exemplary type system, according to an example embodiment.
Figure 7E:
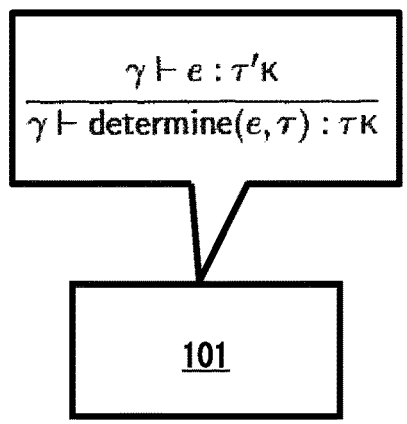
FIG. 7E is a diagram illustrating a determination annotation of an exemplary type system, according to an example embodiment.

FIG. 5 illustrates chaincode methods that type system 101 handles. FIG. 6 gives a definition of determinism of chaincode method name(x1, . . . , xn) {c}, according to an example embodiment, where µ1 and µ2 are the execution state (i.e. a mapping from variables to values), x1, . . . , xn are the method parameters, c is method commands, and W1, W2 are the resulting write sets (i.e. a set of key-value pairs registered in the ledger as the execution result), and DL1 and DL2 means the ledgers, v1? and v2? mean returned results for the execution of the method. DL⊢-(c, µ, { }) → *(v?, µ', W) means that when the command sequence c is executed under the ledger DL and the execution state µ, the value v? is returned as a result, the execution state becomes µ', and the write set W is registered in the leger LD. FIG. 7A illustrates types and operators of type system 101. FIG. 7B illustrates part type relationships and part deterministic relations of type system 101. FIG. 7C illustrates typing rules on formulas of type system 101. FIG. 7D illustrates typing rules on commands of type system 101. FIG. 7E illustrates a determination annotation of type system 101.

Type system 101 considers (stores) the following types, as shown in FIG. 7A to 7D:

(determinism degrees) δ::=D|N, (data types) τ::=δ|δ_e List [δ_s, δ_A]|δ_e Set[δ_s, δ_A]|[δ_{e1}δ_{e2}] Map[δ_s] (data types τ forms a lattice by partial order given later), (control data types) σ::=τκ, (kinds) κ::=𝟙 |1[L]|![l]|*[l]|* (l is for-loop-id-label, and L is a set of for-loop-id-labels).

D (and N) is type for deterministic (and non-deterministic) basic values (e.g. Integers, Strings, Booleans . . . ), δ_e, δ_s, δ_A means the determinism of element, size and arrangement of containers. i.e. maps, lists, sets (i.e. lists where all elements are different), e.g. D List [N,D] is type of lists which have deterministic elements in deterministic order but have non-deterministic size.

For example, makeList("A", rand( )) generates a list of type D List [N,D] for the functions makeList(x,n) which make a new list containing n pieces of x and rand( ) which generates a random integer.

κ means how to each value changes in for-loop

*[l] indicates the value kind which is varied over a range of multi-set in for-loop l.

![l] indicates the value kind which is varied over a range of a set in for-loop l and is not varied into the same value in each the loop-execution. The values of this kind can be deterministic keys or indexes in the for-loop.

1[L] is the kind of values which are not changed in for-loop l not-in L and are deterministically updated in loop l in L. The values of this kind can be deterministically overwritten into variable or container.

𝟙 is the bottom kind of lattice κ and * is the top kind of lattice κ.

Also, type system 101 considers (stores) the following assertion, as shown in FIG. 7E:

determine(e, τ): the data type (so determinism degree) of e has been judged as τ by user.

Type system 101 performs information analysis for inferring the above-mentioned type for each value which occur in target chaincode (Step S1 in FIG. 3). Type system 101 generates order constraints on data types τ and kinds κ for all values used in chaincode, based on typing rules (shown in FIGS. 7B, 7C and 7D) of type system 101 for judging whether the chaincode is deterministic or not. Type system 101 solves the order constraints on data types and kinds (shown in FIGS. 7B, 7C and 7D). If the constraints can be solved, the chaincode is well-typed and deterministic. Otherwise, the code may be non-deterministic. Also, user can annotate determine assertions of the form determine (e, τ), which declare that annotated parts of chaincode can be considered as deterministic. Such assertions can be integrated into the type system by using the rule shown in FIG. 7E. This enables flexible analysis considering user knowledge for the chaincode and can compensate for the accuracy of the analysis.

Two examples chaincode are presented to explain how the type system 101 works.

The following code regData is one example of non-deterministic code, where time.getData( ) returns a string representing current date and time, checkTime(t) checks the time representing string and LD.put(k,v) registers the key value pair (k,v) in the ledger. The value returned by time.get-Data( ) is non-deterministic because the returned time may be different in peer node 200 where each code is executed. So, Ledger.put("D",data) is non-deterministically executed depending on the non-deterministic value. Therefore, the code is non-deterministic code.

```
//Ex1. Non-Deterministic Code1
regData (data) {
    t := time.getDate( );
    if (checkTime(t)) {
        Ledger.put("D",data);
    }
}
t : N    -- (1) because time.getData( ) return N-value
checkTime(t) : N   -- (2) from (1)
Ledger.put("D",data) : N cmd   -- (3) from (2)
```

In (3), N cmd indicates only N value can be stored into a container (That is, all stored values in the command typed with N cmd are considered as N).

In this example, data needs to be N[N⊑deg(data)]. But, all value stored in DL need to be D [deg(data)⊑D]. Thus, there is no solution for deg(data), s.t. deg(data)⊑D and there is no solution for deg(data). Therefore, the code is not well-typed and non-deterministic code, which should not be deployed in peer nodes 200 (Step S2).

The following code regKeys is another example of non-deterministic code, where encode(x) deterministically converts string x into a map structure and map1.keys returns a set collection where elements are not in deterministic order, so element in the set is assigned to the variable k in non-deterministic order. So, the value stored in variable keys is non-deterministic and the non-deterministic value is stored into DL by using Ledger.put("KS", keys). Therefore, the code is non-deterministic code, which should not be deployed in peer nodes 200 (Step S2).

```
//Ex2. Non-Deterministic Code2
regKeys (kvs) {
    map1 := encode(kvs);
    keys := "#"
    for (k in map1.keys) {
        keys := keys @ k @ "#"
    }
    Ledger.put("KS",keys)
}
kvs : D   -- (1) because parameter value is considered as deterministic value
map1 : D   -- (2) by (1) and encode is deterministic function.
map1.keys : D Set[D,N] -- (3) both elements in / size of the list (i.e. map1.keys) are
deterministic but element order is non-deterministic.
k : D![1]    -- (4) by (3)
keys@k@"#" : D![1]   -- (4) by (3) and "fixstr"@x and x@"fixstr" is one-to-one
deterministic function for fixed string "fixstr".
N ⊑ deg(keys)   -- (5) because, for command keys := v,  keys need to be N if v: δ ![1].
However, all values stored into DL need to be D, so variable keys needs to be deg(keys)
⊑ D. There is no solution for deg(keys) s.t. N⊑deg(keys) and deg(keys)⊑ D.
```

So, the code is not well-typed and non-deterministic, which should not be deployed in peer nodes 200 (Step S2).

With type system 101, chaincode developer can automatically check whether the code is deterministic or not, which improves quality of chaincode and reduce the cost of testing the chaincode because the checking whether the chaincode is deterministic or not is currently performed by manual work.

Figure 8:
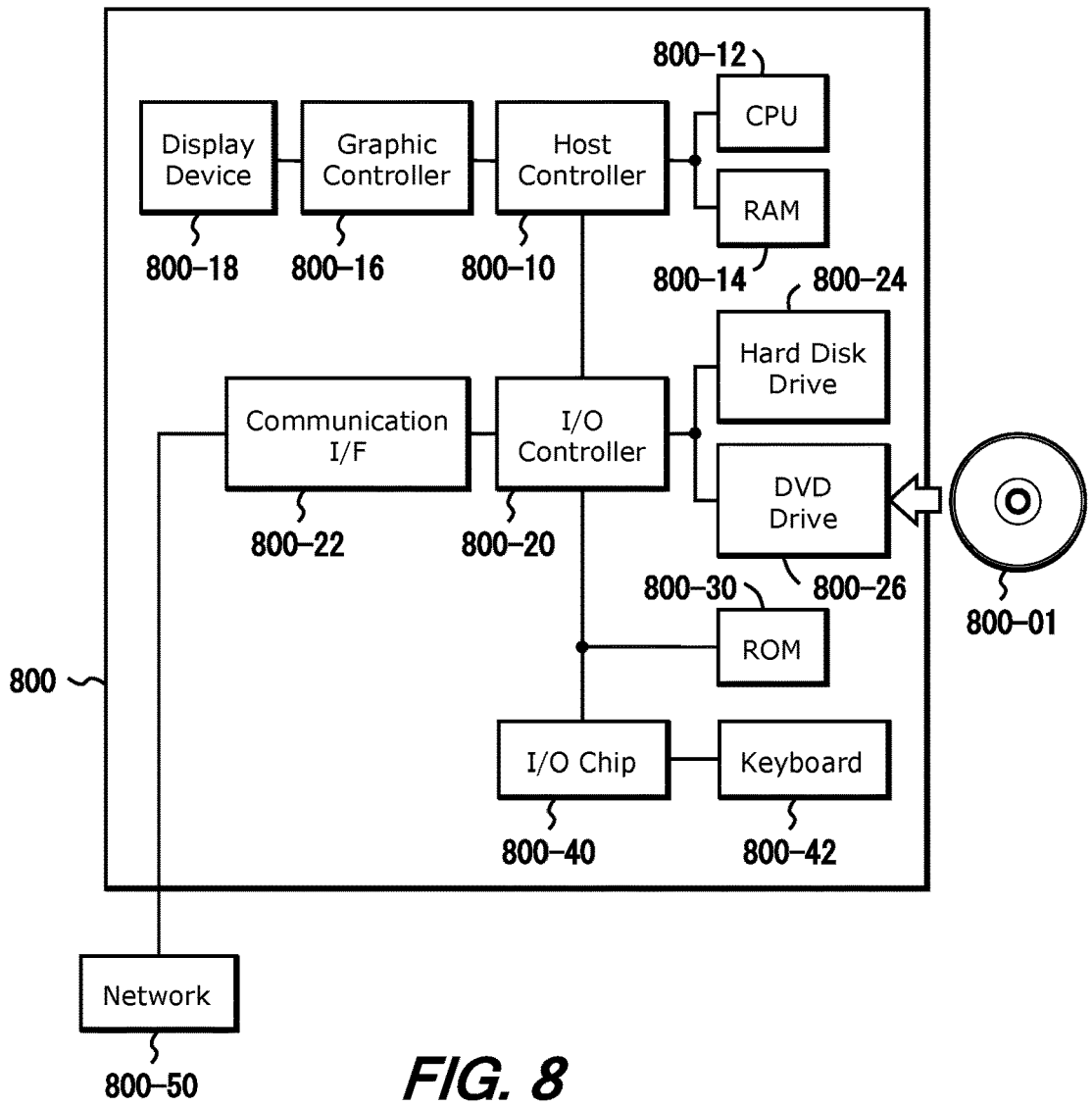
FIG. 8 is a diagram illustrating a hardware configuration of a computer that functions as a type system, according to an example embodiment.

FIG. 8 illustrates a hardware configuration of a computer configured for cloud service utilization of developer system 100 which functions as type system 101, according to an example embodiment. A program that is installed in the computer 800 can cause the computer 800 to function as or perform operations associated with apparatuses of the example embodiments or one or more sections (including modules, components, elements, etc.) thereof, and/or cause the computer 800 to perform processes of the example embodiments or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/ replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The example embodiments may be directed to a system, a method, and/or a computer program product. The computer program product may include a computer readable storage medium (or media) having computer readable program instructions thereon for causing a processor to carry out aspects of the example embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the example embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the example embodiments.

Aspects of the example embodiments are described herein with reference to flowchart illustrations and/or block diagrams of methods, apparatus (systems), and computer program products according to the example embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described, the technical scope is not limited to the above described embodiments. It is apparent to persons skilled in the art that various alterations and improvements can be added to the above-described embodiments. It is also apparent from the scope of the claims that the embodiments added with such alterations or improvements can be included in the technical scope.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method, comprising:
   executing smart contract code that is to be deployed in a blockchain node of a blockchain network; and
   determining whether or not the smart contract code is deterministic by applying a type system to the smart contract code based on a first set of security level values and a second set of security level values;
   wherein the first set of security level values comprise deterministic values and the second set of security level values comprise non-deterministic values, and the determination is performed based on an annotation within the smart contract code.

2. The computer-implemented method of claim 1, wherein the determination is performed based on determinism degrees for the deterministic values and the non-deterministic values.

3. The computer-implemented method of claim 1, wherein the determination is performed based on list data types that represent a determinism degree of an element, a size, and an arrangement.

4. The computer-implemented method of claim 1, wherein the determination is performed based on control data types having values that vary over a range of a set of values used by a for-loop statement within the smart contract code.

5. The computer-implemented method of claim 1, wherein the determination is performed based on a deterministic order of values used in the smart contract code.

6. The computer-implemented method of claim 1, further comprising:
   issuing an alert in response to the smart contract code being determined as non-deterministic.

7. An apparatus, comprising:
   a processor; and
   memory, wherein the processor and memory are communicably coupled to one another;
   wherein the processor is configured to:
      execute smart contract code that is to be deployed in a blockchain node of a blockchain network; and
      determine whether or not the smart contract code is deterministic by applying a type system to the smart contract code based on a first set of security level values and a second set of security level values;

wherein the first set of security level values comprise deterministic values and the second set of security level values comprise non-deterministic values, and the processor is further configured to perform the determination based on an annotation within the smart contract code.

8. The apparatus of claim 7, wherein the processor is configured to perform the determination based on determinism degrees for the deterministic values and the non-deterministic values.

9. The apparatus of claim 7, wherein the processor is configured to perform the determination based on list data types that represent a determinism degree of an element, a size, and an arrangement.

10. The apparatus of claim 7, wherein the processor is configured to perform the determination based on control data types having values that vary over a range of a set of values used by a for-loop statement within the smart contract code.

11. The apparatus of claim 7, wherein the processor is configured to perform the determination based on a deterministic order of values used in the smart contract code.

12. A non-transitory computer-readable medium comprising instructions that when read by a processor cause the processor to perform a method comprising:

executing smart contract code that is to be deployed in a blockchain node of a blockchain network; and determining whether or not the smart contract code is deterministic by applying a type system to the smart contract code based on a first set of security level values and a second set of security level values;

wherein the first set of security level values comprise deterministic values and the second set of security level values comprise non-deterministic values, and the determination is performed based on an annotation within the smart contract code.

13. The non-transitory computer readable medium of claim 12, wherein the determining is performed based on determinism degrees for the deterministic values and the non-deterministic values.

14. The non-transitory computer readable medium of claim 12, wherein the determining is performed based on list data types that represent a determinism degree of an element, a size, and an arrangement.

15. The non-transitory computer readable medium of claim 12, wherein the determination is performed based on control data types having values that vary over a range of a set of values used by a for-loop statement within the smart contract code.

16. The non-transitory computer readable medium of claim 12, wherein the determining is performed based on a deterministic order of values used in the smart contract code.

* * * * *